(12) United States Patent
Petridis

(10) Patent No.: US 7,748,354 B2
(45) Date of Patent: Jul. 6, 2010

(54) SYSTEM AND METHOD FOR ADAPTIVE CONTROL OF VARIABLE VALVE LIFT TAPPET SWITCHING

(75) Inventor: Themi Philemon Petridis, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 444 days.

(21) Appl. No.: 11/379,184

(22) Filed: Apr. 18, 2006

(65) Prior Publication Data

US 2007/0240653 A1     Oct. 18, 2007

(51) Int. Cl.
    *F01L 1/34*        (2006.01)
(52) U.S. Cl. ............... 123/90.15; 123/90.16; 123/90.48
(58) Field of Classification Search ... 123/90.15–90.17, 123/90.48, 90.31
    See application file for complete search history.

(56) References Cited

U.S. PATENT DOCUMENTS

| | | | |
|---|---|---|---|
| 4,995,351 A | 2/1991 | Ohkubo et al. | |
| 5,195,470 A | 3/1993 | Ikeura | |
| 5,495,830 A | 3/1996 | Wu | |
| 5,690,065 A | 11/1997 | van Vuuren | |
| 6,330,869 B1 | 12/2001 | Yoshiki et al. | |
| 6,640,771 B2 * | 11/2003 | Fuerhapter | 123/295 |
| 6,691,653 B2 | 2/2004 | Denz | |
| 6,820,591 B2 * | 11/2004 | Tanei et al. | 123/406.21 |
| 2003/0131805 A1 * | 7/2003 | Yang | 123/27 R |
| 2004/0031466 A1 * | 2/2004 | Ogiso et al. | 123/348 |
| 2004/0244732 A1 | 12/2004 | Kojic et al. | |
| 2005/0092273 A1 * | 5/2005 | Cecur et al. | 123/90.16 |
| 2005/0252464 A1 | 11/2005 | Aikawa et al. | |
| 2006/0272616 A1 | 12/2006 | Kuzuyama | |

FOREIGN PATENT DOCUMENTS

| | | | |
|---|---|---|---|
| DE | 19602013 A1 * | 7/1997 | |
| EP | 1138896 A | 10/2001 | |
| EP | 1435445 A | 7/2004 | |
| WO | WO 99/42718 A | 8/1999 | |
| WO | WO 00/28198 A | 5/2000 | |

OTHER PUBLICATIONS

Abstract of DE19602013.*

* cited by examiner

*Primary Examiner*—Zelalem Eshete
(74) *Attorney, Agent, or Firm*—Allan J. Lippa; Alleman Hall McCoy Russell & Tuttle LLP

(57) ABSTRACT

A method of controlling cylinder valve switching between a first valve condition and a second valve condition for transitioning between combustion modes of an engine comprises adjusting timing of a signal to switch between said valve conditions in response to information from a combustion sensor, wherein said combustion modes include spark ignition and homogeneous charge compression ignition.

20 Claims, 11 Drawing Sheets

SYSTEM AND METHOD FOR ADAPTIVE CONTROL OF VARIABLE VALVE LIFT TAPPET SWITCHING

FIELD

The present application relates to systems and methods for control of variable valve lift tappet switching during transition of combustions modes.

BACKGROUND AND SUMMARY

Engines may use various cylinder intake and/or exhaust valve profiles to improve engine operation over a range of conditions. For example, engines may use variable valve timing, cam profile switching, and others to provide different valve operation. Switches between the different valve profiles are typically controlled via hydraulic circuits, which may have variable delays. These delays can result in valve operation different than that desired for a given combustion event.

One approach considering the delay of an oil circuit for changing valve characteristics is described in U.S. Pat. No. 6,330,869 where the combustion before and after the changeover of valve operation is a spark ignited combustion. In this reference, the property of the working oil in the hydraulic valve characteristic changing mechanism of the valve moving apparatus is detected, and the delay time is altered in accordance with the detected property of the working oil to make a change of the valve operation coincide with the change of the combustion condition of the engine.

However, the inventors herein have recognized disadvantages with such an approach, especially when applied to an engine changing combustion modes during the switch in valve operation, such as between a spark ignition combustion and a compression ignition combustion.

Specifically, there are numerous factors that may affect the valve switching and combustion modes. For example, the time delay may include factors such as delays in the electronic and solenoid valves. In addition, external conditions such as humidity or altitude may affect the response time of the tappet switch order required for transitioning combustion modes between different combustion modes, such as spark and compression ignition. Finally, errors in tappet switching may result in undesired combustion modes in cylinders and may cause engine misfires in a compression ignition mode, for example.

Thus, in one approach, the above issue may be addressed by a method of controlling cylinder valve switching between a first valve condition and a second valve condition for transitioning between combustion modes of an engine. The method comprises adjusting timing of a signal to switch between said valve conditions in response to information from a combustion sensor, wherein said combustion modes include spark ignition and homogeneous charge compression ignition.

In this way, it is possible to compensate for dynamics of the oil circuit and the delay in electronic components via combustion sensor information. Thus, it is possible to provide accurate control of a valve switching order during transition of combustion modes, thereby reducing torque fluctuations, emission spikes, vibration and audible noise. In one embodiment, information as to the timing of when each tappet has switched may be used to provide appropriate signal timing so that the correct amount of fuel can be injected into the respective cylinder, and the required temperature and pressure can be achieved inside the cylinder to perform desired combustion modes such as HCCI and SI.

Furthermore, learned modifications to the switching time and/or order may be achieved enabling adaptation over time based on information from a combustion sensor to account for system degradation as well as external conditions such as humidity or altitude.

DETAILED DESCRIPTION

Figure 1:
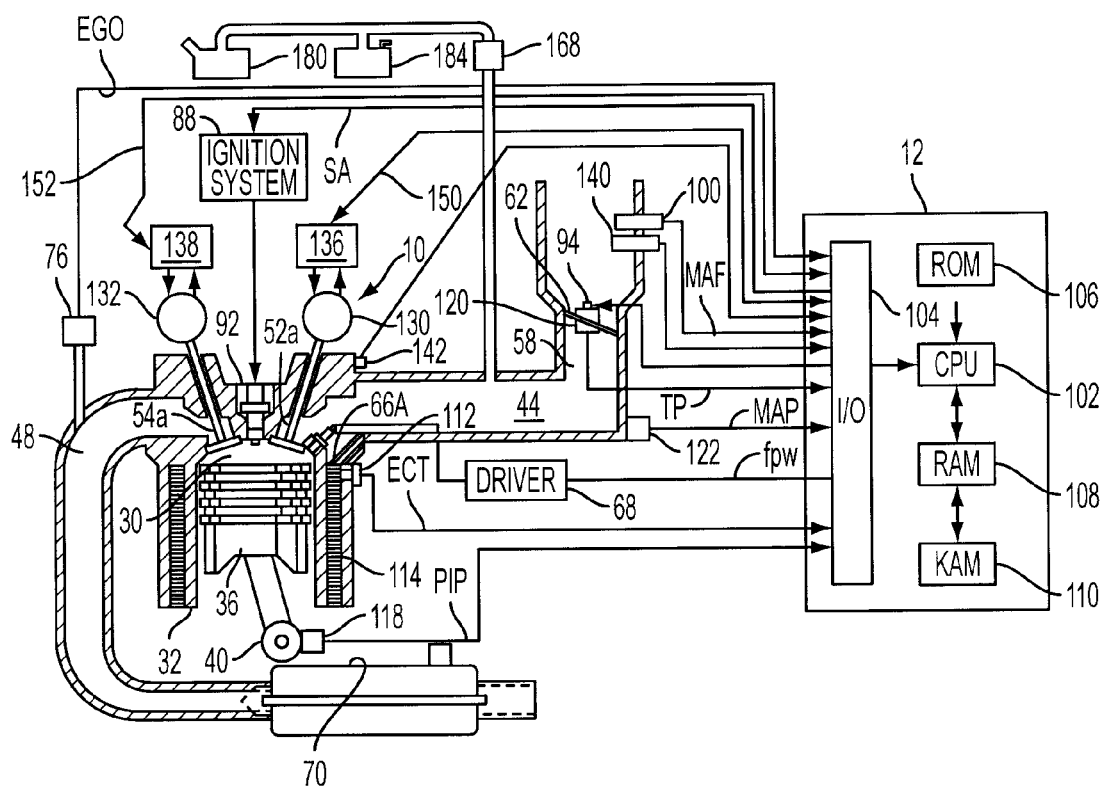
FIG. 1 shows an example engine cylinder configuration.

FIG. 1 shows one cylinder of a multi-cylinder engine, as well as the intake and exhaust path connected to that cylinder. Continuing with FIG. 1, direct injection internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). Combustion chamber, or cylinder, 30 is shown communicating with intake manifold 44 and exhaust manifold 48 via respective intake valves 52a and 52b (not shown, see FIG. 2), and exhaust valves 54a and 54b (not shown, see FIG. 2). Fuel injector 66A is shown directly coupled to combustion chamber 30 for delivering injected fuel directly therein in proportion to the pulse width of signal fpw received from controller 12 via electronic driver 68. The fuel injector may be mounted in the side of the combustion chamber or in the top of the combustion chamber, for example. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control.

Exhaust gas sensor 76 is shown coupled to exhaust manifold 48 upstream of catalytic converter 70. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Ignition system 88 provides an ignition spark to combustion chamber 30 via spark plug 92 in response to spark advance signal SA from controller 12, under selected operating modes. Though spark ignition components are shown, engine 10 (or a portion of the cylinders thereof) may be operated in a compression ignition mode, with or without spark assist, as explained in more detail below. Further, in an alternative embodiment, the combustion chamber has no spark plug.

Controller 12 may be configured to cause combustion chamber 30 to operate in various combustion modes, as described herein. The fuel injection timing may be varied to provide different combustion modes, along with other parameters, such as EGR, valve timing, valve operation, valve deactivation, etc.

Emission control device 70 is shown downstream of exhaust manifold 48. The device may be a three way catalyst, NOx trap, various other devices, or combinations thereof.

FIG. 1 further shows a vapor recovery system enabling recovery of fuel vapors from fuel tank 180 and fuel vapor storage canister 184 via purge control valve 168.

Controller 12 is shown in FIG. 1 as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect (or other type) sensor 118 coupled to crankshaft 40; and throttle position, TP, from throttle position sensor 120; and absolute manifold pressure signal, MAP, from sensor 122. Engine speed signal, RPM, is generated by controller 12 from PIP signal in a conventional manner and manifold absolute pressure signal MAP from a manifold pressure sensor provides an indication of vacuum, or pressure, in the intake manifold. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 1, engine 10 is shown with an intake camshaft 130 and an exhaust camshaft 132, where camshaft 130 actuates both intake valves 52*a,b* and camshaft 132 actuates both exhaust valves 54*a,b*. The valves can be actuated via lift profiles (see FIG. 2) on the camshafts, where the lift profiles between the different valves may vary in height, duration, and/or timing. However, alternative camshaft (overhead and/or pushrod) arrangements could be used, if desired.

Figure 2A:
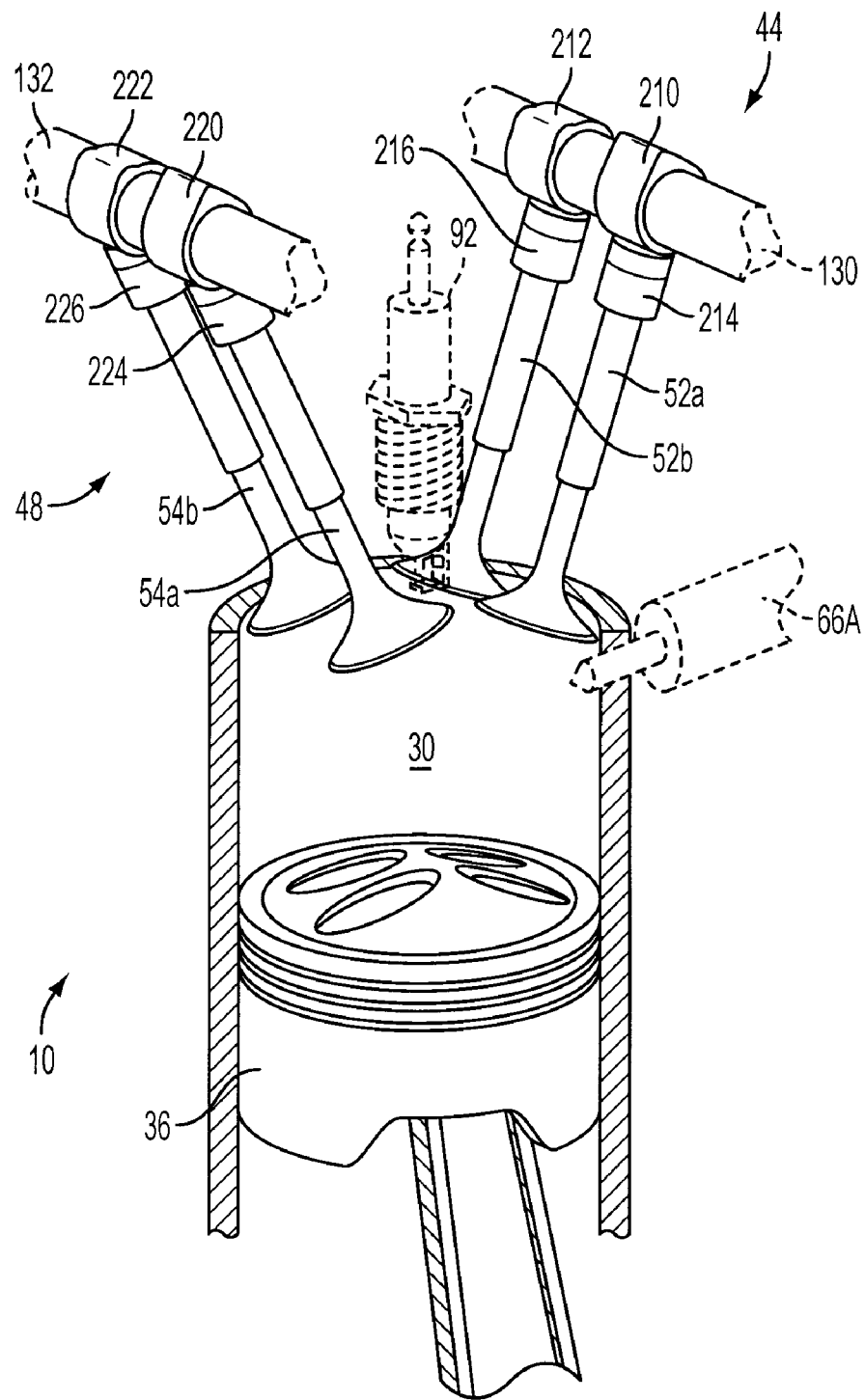
FIGS. 2A-B show detailed views of example combustion chambers.
Figure 2B:
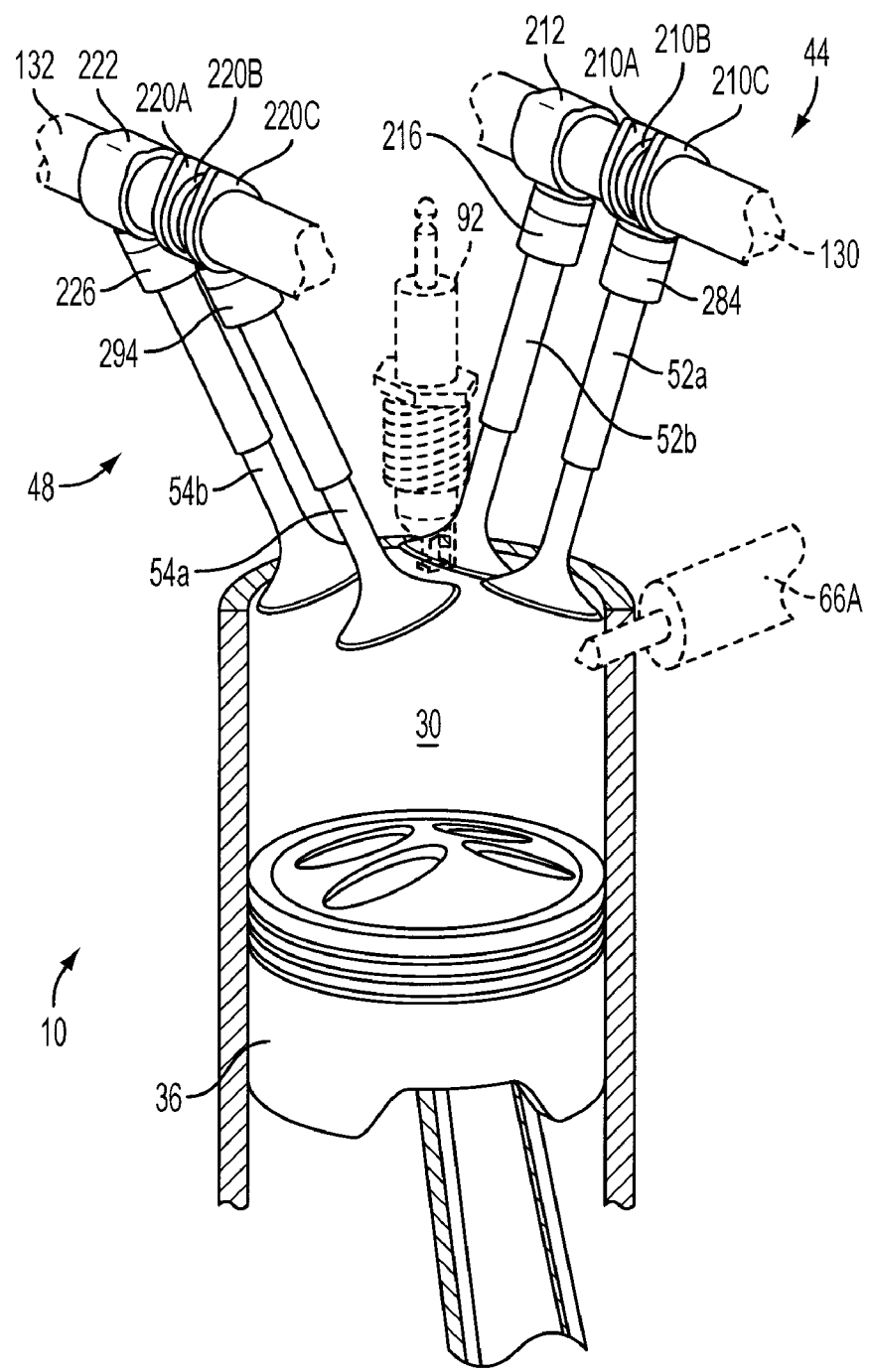

In one embodiment, which will described in more detail with regard to FIG. 2A, a deactivatable tappet may be used in the valve stem of one or more of the intake and exhaust valves 52 and 54 to provide individual valve deactivation under selected operating conditions. In this example, the tappet may have a lost motion action, for example. However, FIG. 2B shows an alternative example in which an alternative deactivatable tappet is shown in which only a portion of the tappet is deactivated. Further, in one example, the cam timing may be varied via actuators 136 and 138, based on operating conditions. The actuators may be hydraulically powered, or electrically actuated, or combinations thereof. Signal line 150 can send a valve timing control signal to unit 136 and receive a cam timing measurement. Likewise, signal line 152 can send a valve timing control signal to unit 138 and receive a cam timing measurement.

As described above, FIG. 1 merely shows one cylinder of a multi-cylinder engine, and that each cylinder has its own set of intake/exhaust valves, fuel injectors, spark plugs, etc. In an alternative embodiment, a port fuel injection configuration may be used where a fuel injector is coupled to intake manifold 44 in a port, rather than directly to cylinder 30.

Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio Humidity sensing may also be employed in connection with the depicted embodiments. For example, an absolute, or relative, humidity sensor (140) may be used for measuring humidity of the ambient air or intake air. This sensor can be located either in the inlet air stream entering manifold 44, or measuring ambient air flowing through the engine compartment of the vehicle, for example. Also note that humidity may be estimated or inferred based on various operating parameters, such as barometric pressure. Alternatively, humidity can be inferred based on auto-ignition characteristics via adaptive learning. Further, barometric pressure and adaptive learning can be used in combination, and may also be used with sensed humidity values.

Further, combustion sensing may be used in connection with the depicted embodiment. For example, a combustion sensor 142 may be coupled to the cylinder. In one embodiment, combustion sensor 142 may be a knock sensor coupled to the head of the cylinder as shown in FIG. 1. In another embodiment, a knock sensor may be located on the body of the cylinder. In yet another embodiment, combustion sensor 142 may be a pressure sensor installed inside the cylinder. In some embodiments, combustion sensor 142 may be an ion current sensor or gasket type sensor. Information from combustion sensor 142 may determine types/modes of combustion as described below and indicate whether combustion performed is predefined or desired. Thus, it is possible to have an adaptive control of transitioning between combustion modes based on information from combustion sensor 142.

As will be described in more detail below, combustion in engine 10 can be of various types/modes, depending on operating conditions. In one example, spark ignition (SI) can be employed where the engine utilizes a sparking device, such as spark plug coupled in the combustion chamber, to regulate the timing of combustion chamber gas at a predetermined time after top dead center of the expansion stroke. In one example, during spark ignition operation, the temperature of the air entering the combustion chamber is considerably lower than the temperature required for auto-ignition. While SI combustion may be utilized across a broad range of engine torque and speed it may produce increased levels of NOx and lower fuel efficiency when compared with other types of combustion.

Another type of combustion that may be employed by engine 10 uses homogeneous charge compression ignition (HCCI), or controlled auto-ignition (CAI), where auto-ignition of combustion chamber gases occurs at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio.

In compression ignition operation mode, it may be desirable to exercise close control over the timing of auto-ignition. The initial intake charge temperature directly affects the timing of auto-ignition. The start of ignition is not directly controlled by an event such as the injection of fuel in a standard diesel engine or the sparking of the spark plug in a spark ignited engine. Furthermore, the heat release rate is not controlled by either the rate or duration of the fuel-injection process, as in a diesel engine, or by the turbulent flame propagation time, as in a spark-ignited engine.

Note that auto-ignition is also a phenomenon that may cause knock in a spark-ignited engine. Knock may be undesirable in spark-ignited engines because it enhances heat transfer within the cylinder and may burn or damage the piston. In controlled compression ignition operation, with its high air-to-fuel ratio, knock does not generally cause degradation of the engine because the diluted charge keeps the rate of pressure rise low and the maximum temperature of the burned gases relatively low. The lower rate of pressure rise mitigates the damaging pressure oscillations characteristic of spark ignition knock.

In comparison to a spark ignition engine, the temperature of the charge at the beginning of the compression stroke typically may be increased to reach auto-ignition conditions at or near the end of the compression stroke. It will be appreciated by those skilled in the art that numerous other methods may be used to elevate initial charge temperature. Some of these include; heating the intake air (heat exchanger), keeping part of the warm combustion products in the cylinder (internal EGR) by adjusting intake and/or exhaust valve timing, compressing the inlet charge (turbo-charging and supercharging), changing the auto-ignition characteristics of the fuel provided to the engine, and heating the intake air charge (external EGR).

During HCCI combustion, auto-ignition of the combustion chamber gas may be controlled to occur at a desired position of the piston or crank angle to generate desired engine torque, and thus it may not be necessary to initiate a spark from a sparking mechanism to achieve combustion. However, a late timing of the spark plug, after an auto-ignition temperature should have been attained, may be utilized as a backup ignition source in the case that auto-ignition does not occur.

A third type of combustion that may be performed by engine 10, such as in the case where a spark device is included, utilizes the sparking device to initiate (or assist) combustion when the temperature of the combustion chamber gas approaches an auto-ignition temperature (e.g., reaches a level substantially near auto-ignition without achieving combustion). Such a spark assist type of combustion can exhibit increased fuel efficiency and reduce NOx production over that of SI combustion, yet may operate in a higher torque range than compared with HCCI combustion. Spark assist may also offer an overall larger window for controlling temperature at a specified timing in the engine cycle. In other words, without spark assistance a small change in temperature may result in a rather large change in combustion timing, thus affecting engine output and performance. In spark assist mode, it is possible to attain many of the benefits of HCCI combustion, while still relying on spark timing to provide the final energy needed to attain auto-ignition in order to more precisely control the timing of combustion. Thus, in one example, under some conditions, spark assist may also be used during transitions between SI combustion and HCCI.

In one embodiment, the spark assist mode may be operated where a small amount of fuel is provided to the gases near the spark plug. This small cloud of fuel may be used to allow a flame to better propagate and generate increased pressure in the cylinder to thereby initiate auto-ignition of the remaining air/fuel mixture. Thus, a relatively small cloud of richer gases may be used that are proximate to the spark plug, which can also be homogeneous, stratified, or slightly stratified. One approach to provide such operation may be to utilize a second direct fuel injection in the compression stroke.

One example of an application involving at least the three combustion modes presented above may include the use of SI for startup and/or after engine startup during an engine warming period. After such engine startup and engine warming, the combustion process may transition through spark assist combustion to HCCI combustion for improved fuel economy and emissions. During periods of high engine torque requirements, spark assist may be activated to ensure proper combustion timing. As the engine is returned to a low or moderate torque requirement, the involvement of spark assist may cease in order to realize the full benefits of HCCI.

As noted above, ambient humidity of air drawn into the engine during the intake stroke may affect combustion temperature via dilution of the charge with material that cannot be oxidized and because the specific heat of water is higher than air. Thus, as humidity increases, to attain a desired auto-ignition timing, initial charge temperature should be adjusted in accordance with humidity levels. For example, use of humidity sensing or estimation may enable improved adjustments to a plurality of engine operating parameters to aid in achieving or maintaining HCCI combustion, even when a vehicle may experience varying levels of ambient humidity. Thus, increasing humidity may require higher initial temperatures and lower humidity may require a lower initial temperature for a given auto-ignition timing at a given speed and torque.

The ambient humidity of air drawn into the engine during the intake stroke also affects peak combustion temperatures because it has a higher specific heat than air, the more common diluent. As the ambient humidity of the air drawn into the engine during the intake stroke increases, the peak combustion temperature is decreased via dilution of the charge with material that cannot be oxidized and subsequently raises the required initial charge temperature to attain efficient HCCI combustion. The ambient or relative humidity can be determined using sensors 140 and/or 141 or may be inferred from other data and passed on to engine controller 12 to determine the ideal adjustments to engine control parameters for efficient operation.

Note that a plurality of other parameters may affect both the peak combustion temperature and the required temperature for efficient HCCI combustion. These and any other applicable parameters may be accounted for in the routines embedded in engine controller 12 and may be used to determine optimum operating conditions. For example, as the octane rating of the fuel increases, the required peak compression temperature may increase as the fuel requires a higher peak compression temperature to achieve ignition. Also, the level of charge dilution may be affected by a variety of factors including both humidity and the amount of exhaust gases present in the intake charge. In this way, it is possible to adjust engine parameters to compensate for the effect of humidity variation on auto-ignition, i.e., the effect of water makes auto-ignition less likely.

While one or more of the above combustion modes may be used in some examples, still other combustion modes may be used, such as stratified operation, either with or without spark initiated combustion.

As noted herein, in one example of a compression or auto-ignition capable engine, the intake valve(s) is (are) actuated either by a high or low lift cam profile depending on the selected combustion mode. The low lift cam profile is used to trap a high level of residual (exhaust) gas in the cylinder. The trapped gasses promote compression or auto-ignition by increasing the initial charge temperature, in some examples. However, in a spark ignition mode (either high or low loads) the high lift cam profile is used. Such a switchable cam profile may be achieved through various cam and tappet systems that switch between an inner and outer land, for example. The switching may be achieved through oil flow hydraulic actuators, which may necessitate a higher flow oil pump, thereby potentially increasing weight and cost and reducing efficiency (e.g., a higher flow oil pump may result in higher parasitic loss due to increased oil volume and potential issues related to a lack of sufficient flow in the oilways). As another example, such systems may involve an increased number of tappets as well as increased machining costs.

Thus, in another embodiment, rather than using a cylinder with a single intake valve (or multiple switchable intake valves) that changes between different profiles, a cylinder with at least two intake valves, where each of the valves has a different lift profile (at least for that cylinder), may be used. During compression or auto-ignition, a higher and/or longer lift intake valve can be disabled through the use of a collapsible tappet, while a lower and/or shorter lift intake valve remains active. During spark ignition, the higher/longer lift intake valve can operate to increase the airflow into the engine, while the lower/shorter lift continues to operate.

Due to the fact that, in this example, only half of the valves now need to be switched, the oil flow requirements for the valve actuation is significantly reduced, thereby reducing the overall oil flow requirements of the engine system. Considering the valve order, in this example, only half the tappets are switchable units and the camshaft may be made with a lower cost manufacturing process with considerably less machining. Further, the oil pump can have a lower working flow rate, reducing cost, and lower parasitic losses. In this way, system cost can be decreased while still providing both spark and compression or auto-ignition, along with transitions there between.

Active valve operation may refer to a valve opening and closing during a cycle of the cylinder, where deactivated valves may be held in a closed position for a cycle of the cylinder (or held in a fixed position for the cycle).

While the above examples illustrate the advantages of a particular situation, the approaches herein can be applied to a variety of different systems and configurations, such as to exhaust systems, as well as systems that have more than two intake or two exhaust valves per cylinder.

Returning to an example intake valve system, the first intake valve can have a lower lift profile, capable on its own of flowing sufficient air to operate the engine in compression or auto-ignition. Further, the first intake valve can have a valve timing (fixed or adjustable) set for compression or auto-ignition. The second intake valve can have a valve lift and/or timing (fixed or adjustable) that provide a balance of air for spark-ignition, over and above the air required for compression or auto-ignition, as illustrated in the example of FIG. 3.

Valve deactivation may be provided via switchable tappets fitted to a higher/longer lift valve, which in one example is active only during spark-ignition operation. During compression or auto-ignition, the tappet may deactivate to leave the higher/longer lift valve closed during a cycle of the cylinder. The lower/shorter lift valve can be permanently active to open and close during a cycle of the cylinder to provide either all the air during compression or auto-ignition, or part of the air for spark ignition.

However, in another embodiment, a higher/longer lift intake valve may also be deactivated under conditions other than compression or auto-ignition, such as during vehicle deceleration to reduce airflow, during deceleration with fuel shut-off, or other conditions. Furthermore, different valves have been denoted as having a higher or shorter lift, which may be identified by a maximum valve lift or an average valve lift height (opening into the cylinder). Likewise, valves with a shorter or longer lift may be identified by a crank angle opening duration, for example, even though the valves may open and/or close earlier or later during the cylinder cycle.

Figure 3:
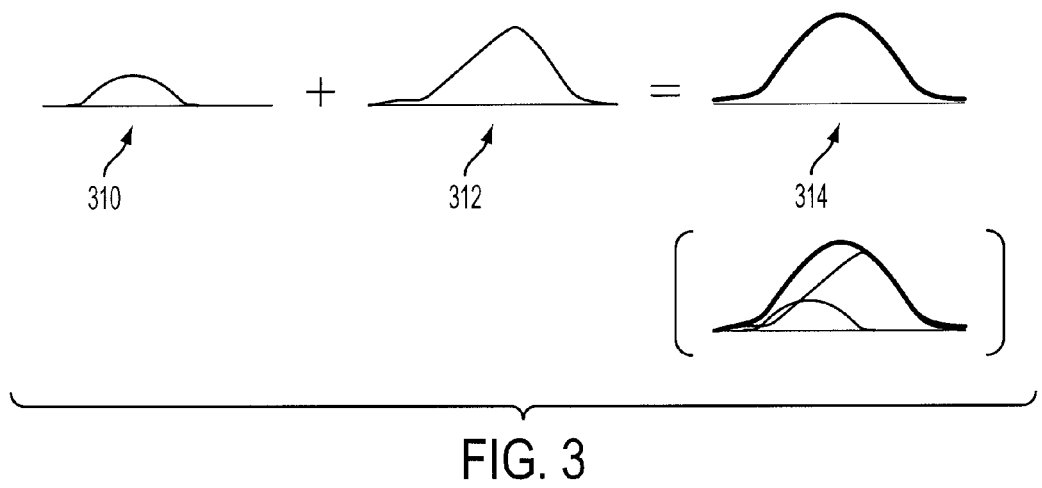
FIG. 3 illustrates example lift profiles.

Referring now to FIG. 2A, it shows an example cylinder configuration where two intake valves (52a and 52b) of cylinder 30 of engine 10 are actuated via a common camshaft 130, with each valve having a different cam profile 210 and 212, examples of which are described in more detail with regard to FIG. 3. The figures show valve 52a having a longer and higher valve lift profile than 52b. In this example, valve 52b is actuated via a tappet 216, while valve 52a is actuated by a collapsible tappet 214, which may be controlled via controller 12.

FIG. 2A also shows two exhaust valves 54a and 54b, also actuated via profiles 220 and 222 through tappets 224 and 226, where tappet 224 may be deactivatable via controller 12. In this example, valve 54a is shown having a longer and higher valve lift profile than valve 54b.

While this example shows an overhead cam engine with a tappet coupled to the valve stems, tappets may also be used with a pushrod engine, and a collapsible tappet may thus be coupled to a pushrod.

Further, the diagram of FIG. 2A shows just one cylinder of engine 10, where the engine may be a multiple cylinder engine with each cylinder the same as, similar to, or different from the one shown in FIG. 2A. Further, while the above valve system can provide advantages in an engine having compression or auto-ignition, it may also be used in other engine combustion systems.

Referring now to FIG. 2B, it shows an alternative camshaft and tappet configuration. Specifically, in this example, the lift profile 210 is divided into lift portions 210A and 210C and a zero lift portion 210B. During active valve operation, tappet 284 is actuated as a unit by profiles 210A and 210C, and during deactivation, an outer portion of 284 is decoupled from an inner portion as described in FIG. 2C, so that valve 52a is not activated. Likewise, lift profile 220 is similarly divided, and tappet 294 is similar to tappet 284. Thus, an alternative approach for deactivation is shown that may provide improved manufacturability, for example. Also note that a single profile, such as 210A, may be used, rather than the double profile (210A and 210C) shown.

Figure 2C:
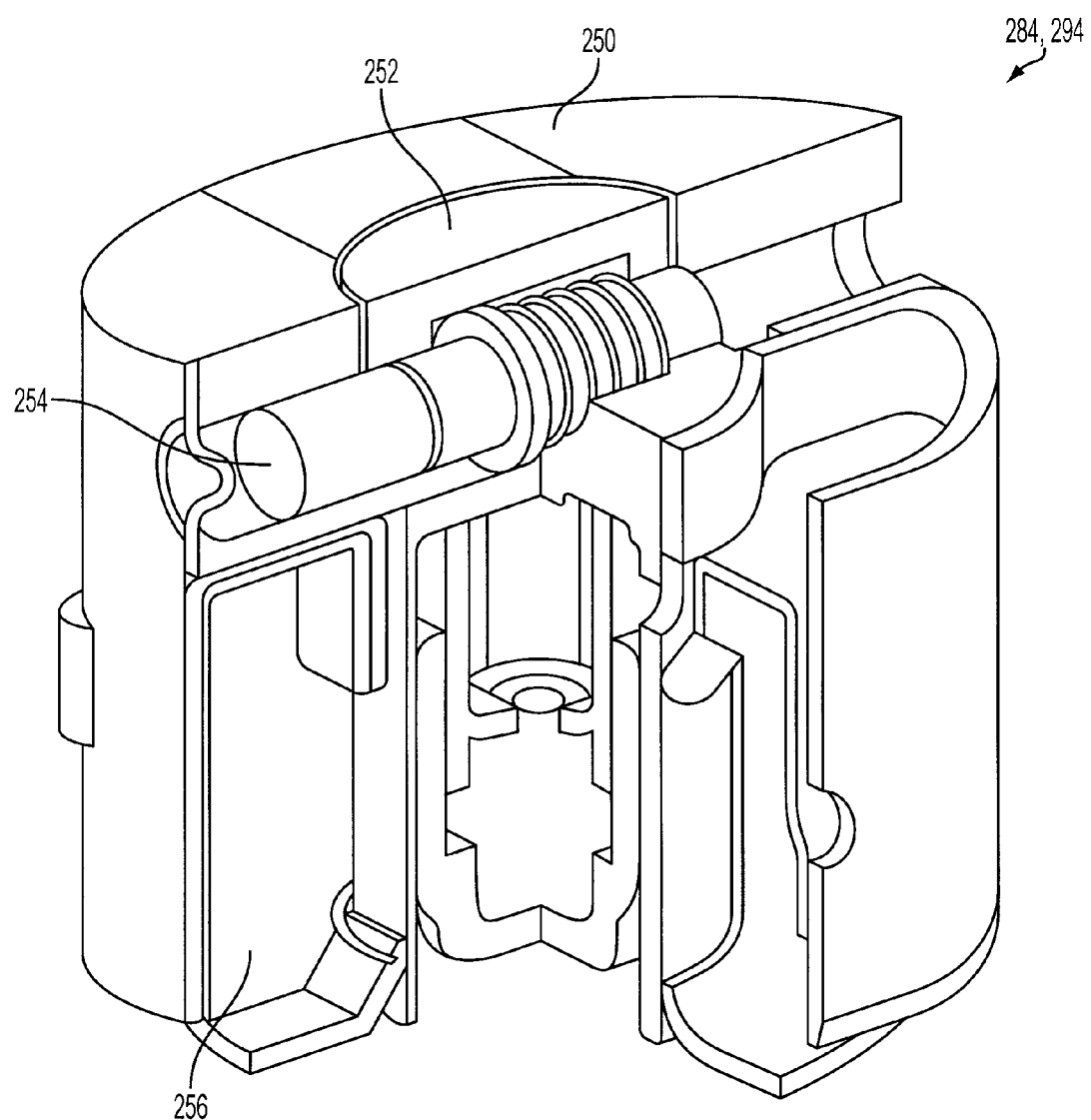
FIG. 2C shows a detailed view of an example tappet for use with the example of FIG. 2B.

Specifically, FIG. 2C shows an alternative deactivatable tappet in which locking pin 254 is used to couple or decouple inner portion 252 from outer portion 250. In this way, when the pin is in the locked position, the motion caused by contact with profiles 210A and 210C causes the inner portion to follow the motion and thus actuate the valve stem and valve coupled to the inner portion. Alternatively, when the pin is the unlocked position, a lost motion spring in interior section 256 causes outer portion 250 to travel separately from inner portion 252. Further, because profile 210B, which is in contact with inner portion 252, has reduced lift or no lift, the valve remains substantially closed and thus the cylinder may be deactivated. Pin 254 may be actuated via hydraulic pressure controlled via a hydraulic valve communicating with the controller, in one example.

In this way, an alternative approach using a deactivatable tappet may be used in which manufacturability of the tappet may be increased, while still retaining the desired action.

Finally, still other examples of valve deactivation may be used, if desired.

Referring now to FIG. 3, it shows at 310 an example lift profile of valve 52b which may be used to provide a desired fresh air charge and residual charge to improve compression or auto-ignition, such as by providing a higher initial charge temperature at the start of compression. As noted herein, in one example, valve 52b does not have a deactivation mechanism. FIG. 3 also shows at 312 an example lift profile of valve 52a, which may be used to provide a desired operation for spark ignition operation. In the example of FIG. 3, profile 312 has some lift portions that are higher than that of 310, and also a longer lift than that of 310. As noted herein, valve 312 may be selectively deactivated during compression or auto-ignition operation via a deactivatable tappet.

When both intake valves are active, an effective lift profile as illustrated by 314, may be achieved, whereas profile 310 can be employed during compression or auto-ignition, at least in one example.

The above example embodiments and alternatives may be used to transition one or more cylinders of an engine between combustion modes. However, to reduce torque fluctuations, emission spikes and NVH during a switch, it may be important to know when each tappet has switched so that the correct amount of fuel can be injected into the respective cylinder. One approach may be to measure switches at the tappet, which may utilize additional sensors and other systems that can increase system cost. Another approach is to infer a switched tappet from in-cylinder pressure measurements of compression immediately following a switch.

As noted above, a switchable tappet mechanism can be used which includes a pin that slides into a locked or unlocked position depending on the oil pressure exerted on the pin. The exact position when each tappet switches may be highly dependent upon the dynamics of the oil circuit. Furthermore, in a particular tappet, if a valve is open and the oil pressure switch threshold is reached, the lock pin may not move until the valve has fully closed and the changed valve lift will not occur until the next valve event. Also, if the lock pin has started to move and a valve event occurs before the pin has fully engaged or disengaged, then the pin may degrade. These factors, along with other aging and degradation effects, make robust control of the tappet switch timing and switching order an important consideration.

One approach, which in the following embodiments is applied to a four cylinder engine, uses an oil circuit configuration that reduces complexity but provides a system with sufficient repeatability and robustness and sufficient variability to handle a variety of operating conditions where the cylinder switching order can be pre-defined and robustly achieved.

Figure 4:
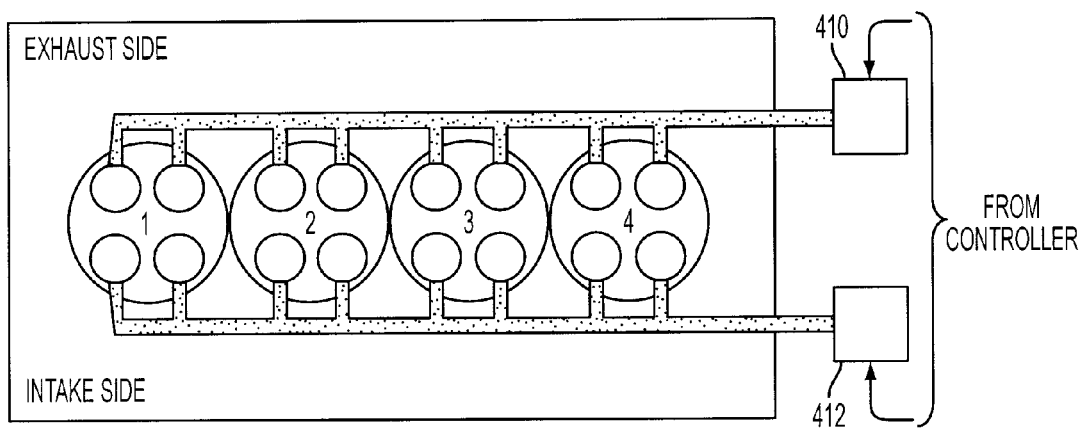
FIGS. 4-5 show example hydraulic actuator circuits for controlling actuation of multi-cylinder valve actuator systems.

With reference to FIG. 4, a first example configuration is described using a first hydraulic actuator 410 and a second hydraulic actuator 412, controlling respective oil pressures to actuators in cylinders one through four as indicated. In this example, the engine firing order is 1-3-4-2, although this is just one example. Continuing with FIG. 4, the two actuators each utilize separate oil galleries for each of the intake tappets and exhaust tappets. This configuration allows independent control of each group of the intake and exhaust valves and may enable sufficient switching windows (depending on response time and switching speeds) for a pre-defined cylinder switching order for both intake and exhaust valves to be achieved, as described in more detail below with regard to FIGS. 6 and 7. As illustrated, it is possible with such a system to achieve a cylinder switching order that is the same for both the intake and exhaust tappets. In other words, because the cam event switching windows used to achieve both an acceptable and robust switch in a pre-defined cylinder switch order do not overlap between the intake and exhaust sides, separate control for intake and exhaust valves of multiple cylinders may be used to obtain the desired switch order.

Figure 5:
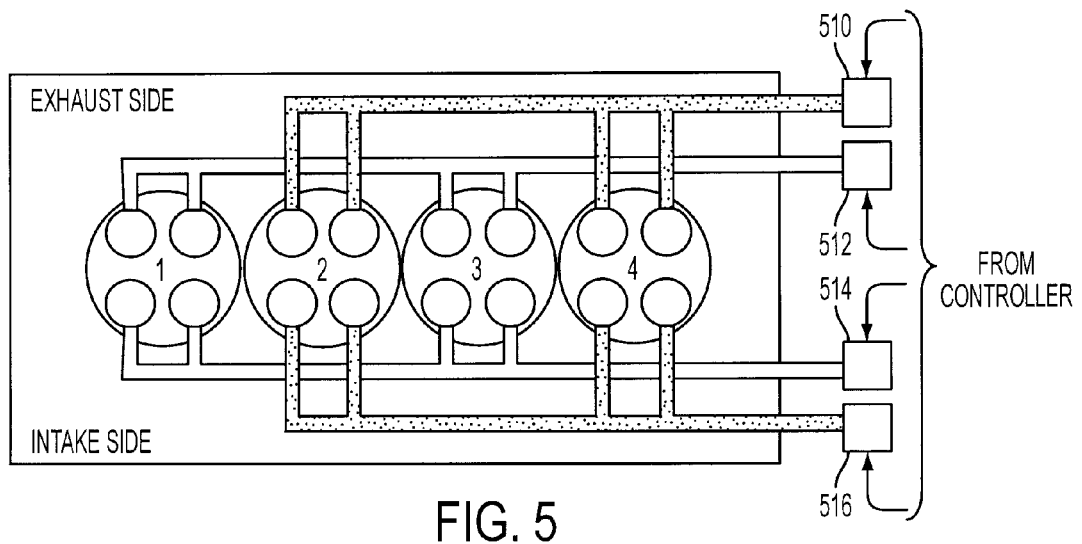

However, in an alternative embodiment, further improvements to robust control may be achieved with the oil circuit configuration of FIG. 5. In this embodiment, the oil circuit uses four actuators (510, 512, 514, and 516) to control the oil pressure in four separate oil galleries. Again, the configuration of FIG. 5 uses a cylinder firing order of 1-3-4-2.

Note that the above approaches may be adapted and/or modified to accommodate alternative firing orders. For example, the oil galleries can be reconfigured to achieve the same or another desired outcome, such as by connecting any two subsequent cylinders in the firing sequence to the same oil gallery. Note that in the above example, the figures show an engine with a single bank of four cylinders. However, the approach may be extended to a V-8 engine, for example, with two engine banks, each having four cylinders. In this case, the firing order of the cylinders of the particular bank may be used to configure the oil galleries, even though the overall engine firing order may switch periodically between banks. In other words, cylinder 3 may fire consecutively after cylinder 1 among the cylinders in the particular bank shown, even though a cylinder in another bank may fire between cylinders 1 and 3.

Figure 8:
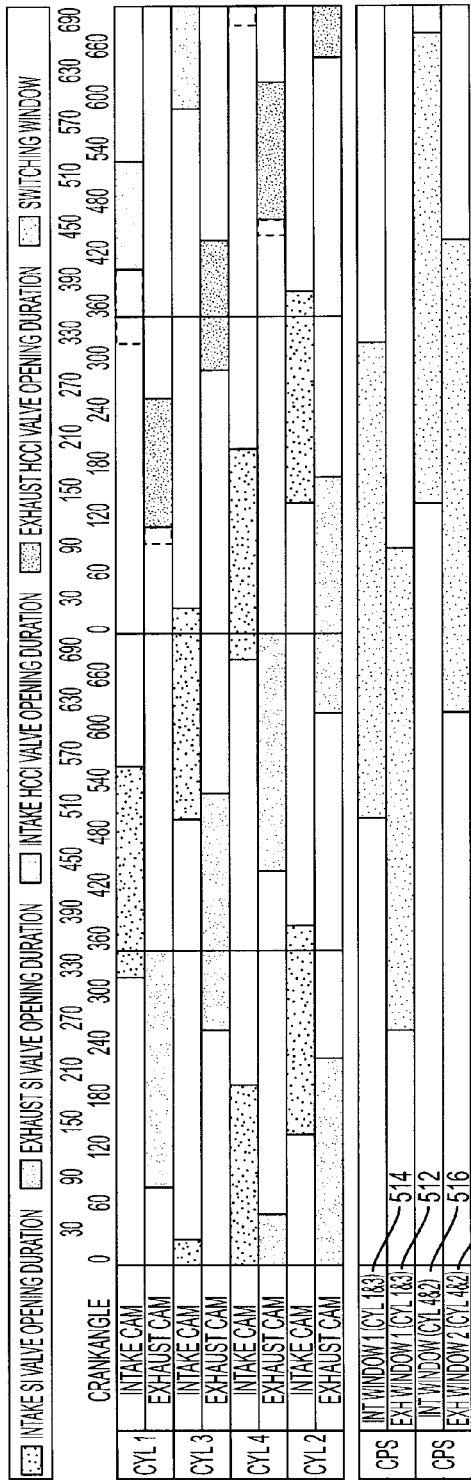
FIGS. 8-9 show example timing diagrams and timing windows for the example configuration of FIG. 5.
Figure 9:
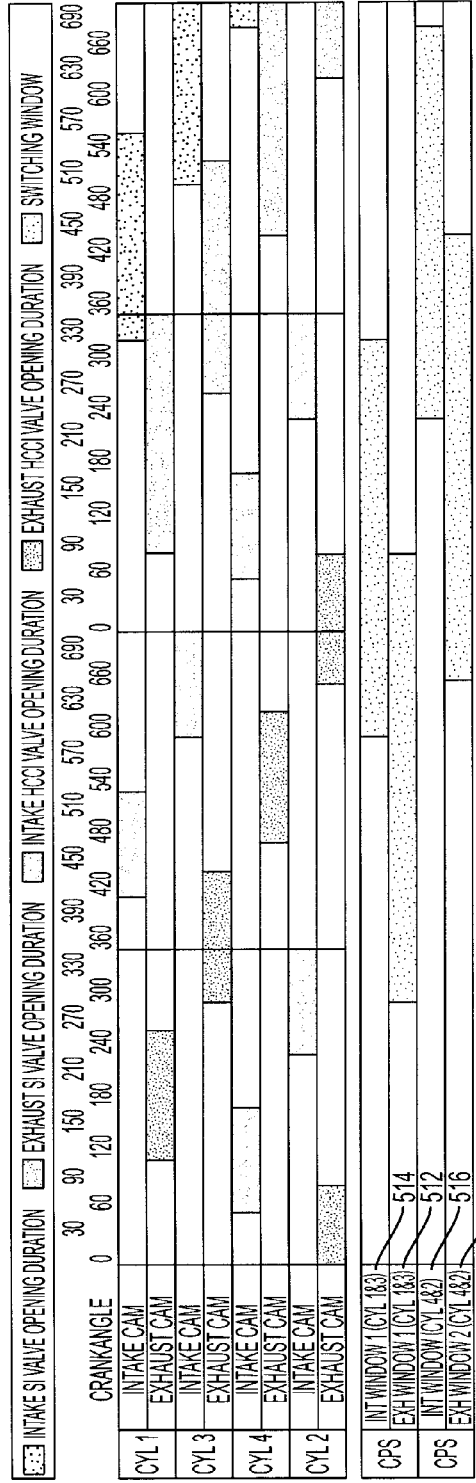

The above configurations may be used to extend the switching window for actuating the valve changing mechanism to values typically in the order of 220 to 270 crank angle degrees, corresponding to an increased range of 6.1 to 7.5 ms at 6000 rpm. A timing diagram illustrating the embodiment of FIG. 5 is illustrated in FIGS. 8 and 9 which show schematic cam event timing charts and the safe switching windows for a switch from SI to HCCI and vice versa respectively.

Figure 6:
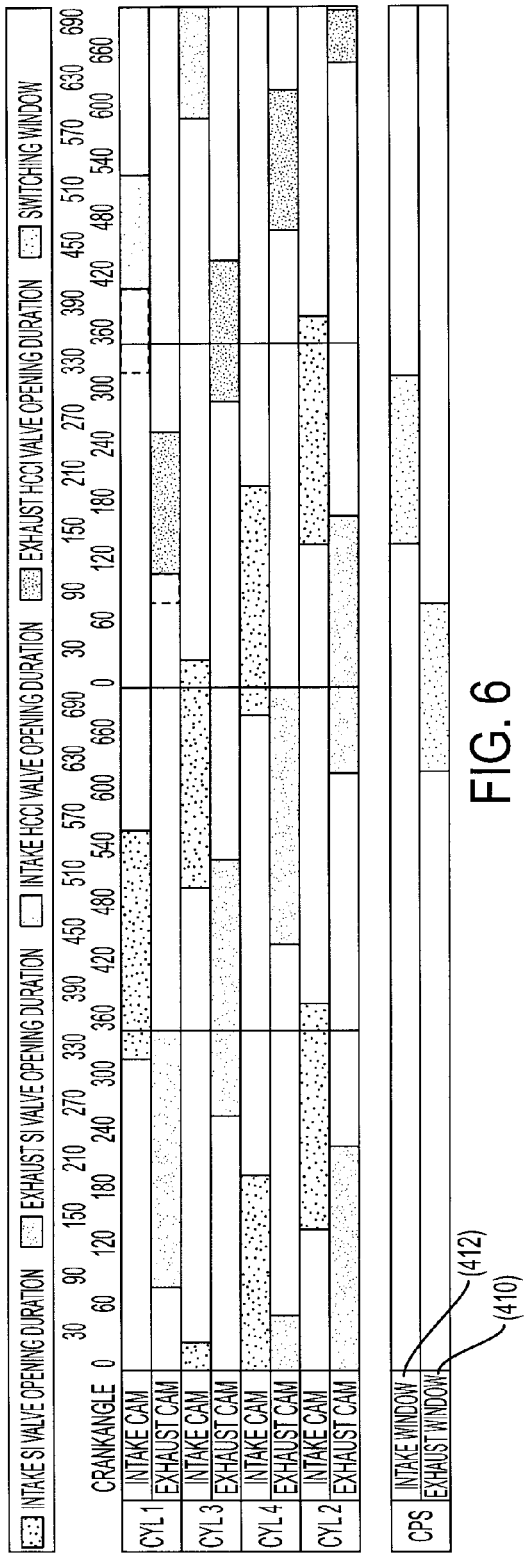
FIGS. 6-7 show example timing diagrams and timing windows for the example configuration of FIG. 4.
Figure 7:
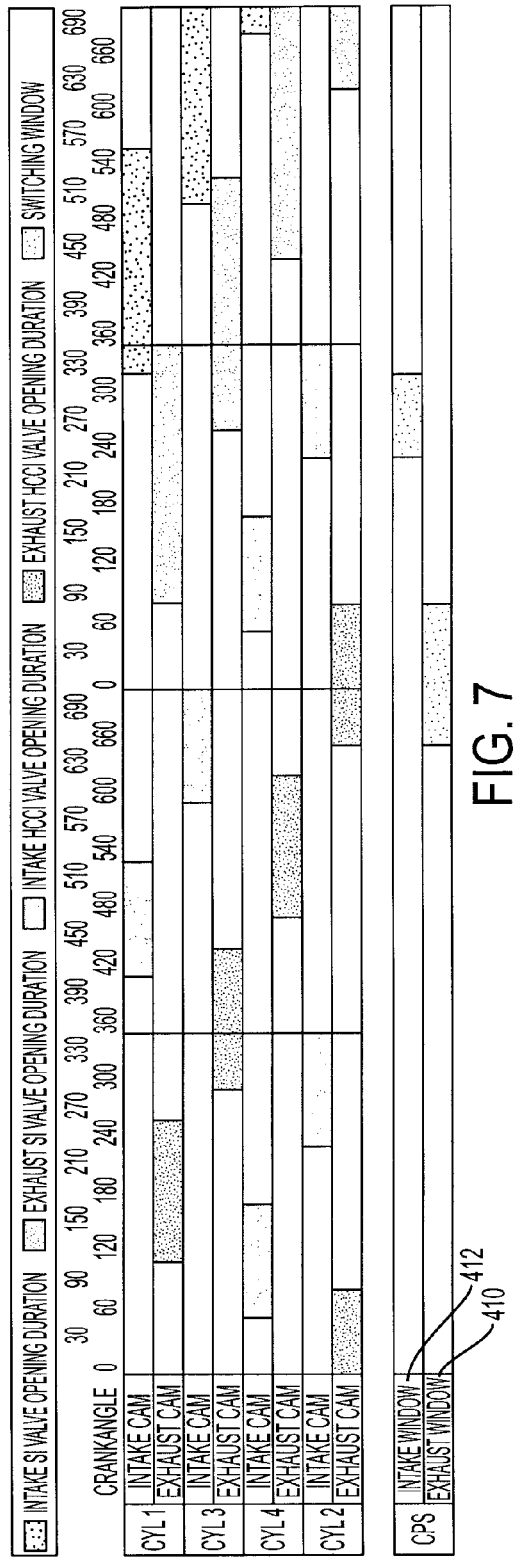

Referring now specifically to FIGS. 6-7, schematic cam event timing charts for the configuration of FIG. 4 (four cylinder engine with a cylinder firing order of 1-3-4-2) are shown for a switch from high lift long duration SI to low lift short duration HCCI, and vice versa, respectively. Specifically, the Figures show the intake and exhaust valve opening durations for each of the cylinders. Further, a cam profile switch (CPS) window is shown for each of the actuators 410 and 412.

The CPS window shows the range of crank angles over which a signal may be sent to the actuator to initiate a switch in valve operation. The beginning and ending regions of the windows are defined by the firing order, valve opening durations, etc. For the example mode switch starting with cylinder number 1, the beginning of the exhaust signal window is defined to be after the opening angle of the exhaust valve for cylinder 2 and the end is before the exhaust valve opening angle of the high lift cam for cylinder 1 (shown by the dashed line on the exhaust cam opening window of cylinder 1). Also note that in this example, the switch is controlled so that for the last combustion event in SI mode, the exhaust lift profile is that of the HCCI type, and the first combustion event in HCCI mode uses an intake lift profile of the HCCI type.

Continuing with FIG. 6, for the example mode switch starting with cylinder number 1, the beginning of the intake signal window is defined to be after the opening angle of the intake valve for cylinder 2 and the end is before the intake valve opening angle of the high lift cam for cylinder 1 (shown by the dashed line on the intake cam opening window of cylinder 1).

Conversely, FIG. 7 shows a transition from HCCI to SI operation, and the corresponding windows for such operation. Note that the window start angles, end angles, and/or durations may be different from those of FIG. 6. This may be due to, for example, the different valve opening timings and durations between the different lift profiles.

Like the example of FIG. 6, the respective intake and exhaust windows of FIG. 7 are keyed to the intake and exhaust valve timings of the cylinders firing immediately before the switch and immediately after the switch in the firing order of the cylinders in the particular engine bank or group of cylinders having a common camshaft. However, in this example, no dashed lines are needed as the valve openings shown determine the windows in the same manner as in FIG. 6.

Depending on the base engine cam timing and duration, the windows may be on the order of 150 crank angle degrees for switching from SI to HCCI and typically on the order of 50 crank angle degrees for switching from HCCI to SI. At 6000 rpm this corresponds to a range of 1.4 to 4.2 ms, which may require precise control, especially when taking into account aging and degradation effects of the oil and oil system. However, if the switching is limited to lower engine speeds, increased robustness may be achieved.

Referring now to FIGS. 8-9, schematic cam event timing charts for the configuration of FIG. 5 (four cylinder engine with a cylinder firing order of 1-3-4-2) are shown for a switch from high lift long duration SI to low lift short duration HCCI, and vice versa, respectively. Specifically, the Figures show the intake and exhaust valve opening durations for each of the cylinders. Further, a cam profile switch (CPS) window is shown for each of the actuators 510 through 516.

The CPS windows show the range of crank angles over which a signal may be sent to the actuator to initiate a switch in valve operation. The beginning and ending regions of the windows are defined by the firing order, valve opening durations, etc. For the example mode switch starting with cylinder number 1, the beginning of the exhaust signal window for cylinders 1 and 3 is defined to be after the opening angle of the exhaust valve for cylinder 3 and the end is before the exhaust valve opening angle of the high lift cam for cylinder 1 (shown by the dashed line on the exhaust cam opening window of cylinder 1). Again, in this example, the switch is controlled so that for the last combustion event in SI mode, the exhaust lift profile is that of the HCCI type, and the first combustion event in HCCI mode uses an intake lift profile of the HCCI type.

Continuing with FIG. 8, for the example mode switch starting with cylinder number 1, the beginning of the intake signal window for cylinders 1 and 3 is defined to be after the opening angle of the intake valve for cylinder 3 and the end is before the intake valve opening angle of the high lift cam for cylinder 1 (shown by the dashed line on the intake cam opening window of cylinder 1). A similar analysis applies for the windows of cylinders 2 and 4, except that the beginning of the exhaust signal window for cylinders 2 and 4 is defined to be after the opening angle of the exhaust valve for cylinder 2 and the end is before the exhaust valve opening angle of the high lift cam for cylinder 4 (shown by the dashed line on the exhaust cam opening window of cylinder 4). Further, the beginning of the intake signal window for cylinders 2 and 4 is defined to be after the opening angle of the intake valve for cylinder 2 and the end is before the intake valve opening angle of the high lift cam for cylinder 4 (shown by the dashed line on the intake cam opening window of cylinder 4).

Conversely, FIG. 9 shows a transition from HCCI to SI operation, and the corresponding windows for such operation. Note that the window start angles, end angles, and/or durations may be different from those of FIG. 8. This may be due to, for example, the different valve opening timings and durations between the different lift profiles.

The cam profile switch window as shown in FIGS. 6-9 illustrates crank angles when the hydraulic switch occurs via an oil gallery. However, as described above, many factors may affect the robust control of tappet switch timing and switching order. In one example, when using tappet switching technology having oil galleries, each acting on multiple cylinders, tappet switching may occur when an oil pressure threshold is reached. Thus, the location where each tappet switches may depend upon the dynamics of the oil circuit. Furthermore, if a tappet is being depressed by a cam lobe when the oil pressure threshold is reached, the tappet will not switch until the next rotation of the cam shaft. In addition, aging, degradation effects, and conditions external to an engine also affect the timing of the switch in valve operation relative to the timing of sending a signal to initiate the switch. These factors include but are not limited to a delay in the electronics and solenoid valves, a variable time delay in the oil circuit, degradation, and external conditions. Since the accurate control of switching of valve profiles affects transitioning of combustion modes such as from HCCI to SI or vice versa and may affect the operation of compression or auto-ignition combustion, at least some of the factors affecting switching may be taken into account in the control strategy.

In one approach, the tappet switch timing may be adjusted according to the combustion conditions in the cylinders by using a combustion sensor. In this approach, the desired tappet or cylinder switching order may be assumed to be known and achievable. For example, cylinder switching order may be 1, 4, 3, 2 in a four cylinder engine. The crank angle at which the switch signal is sent may vary with engine speed or any other operating parameters. In one embodiment, a calibration of crank angles with different engine speeds may be made to achieve repeatable tappet switch timing or switch order. In another embodiment, a calibration of crank angles with different oil temperature may be used to achieve desired switch timing or switch order. The calibration of operating parameters may take into account the relatively constant pure time delay present in the electronics and solenoid valves, and the extremely variable time delay in the oil circuit. However, the calibration of the requested crank angle for the switch signal may not be sufficient for adaptation over time since factors other than the operation of valve mechanism may affect the correct response time of the tappet switch.

Figure 10:
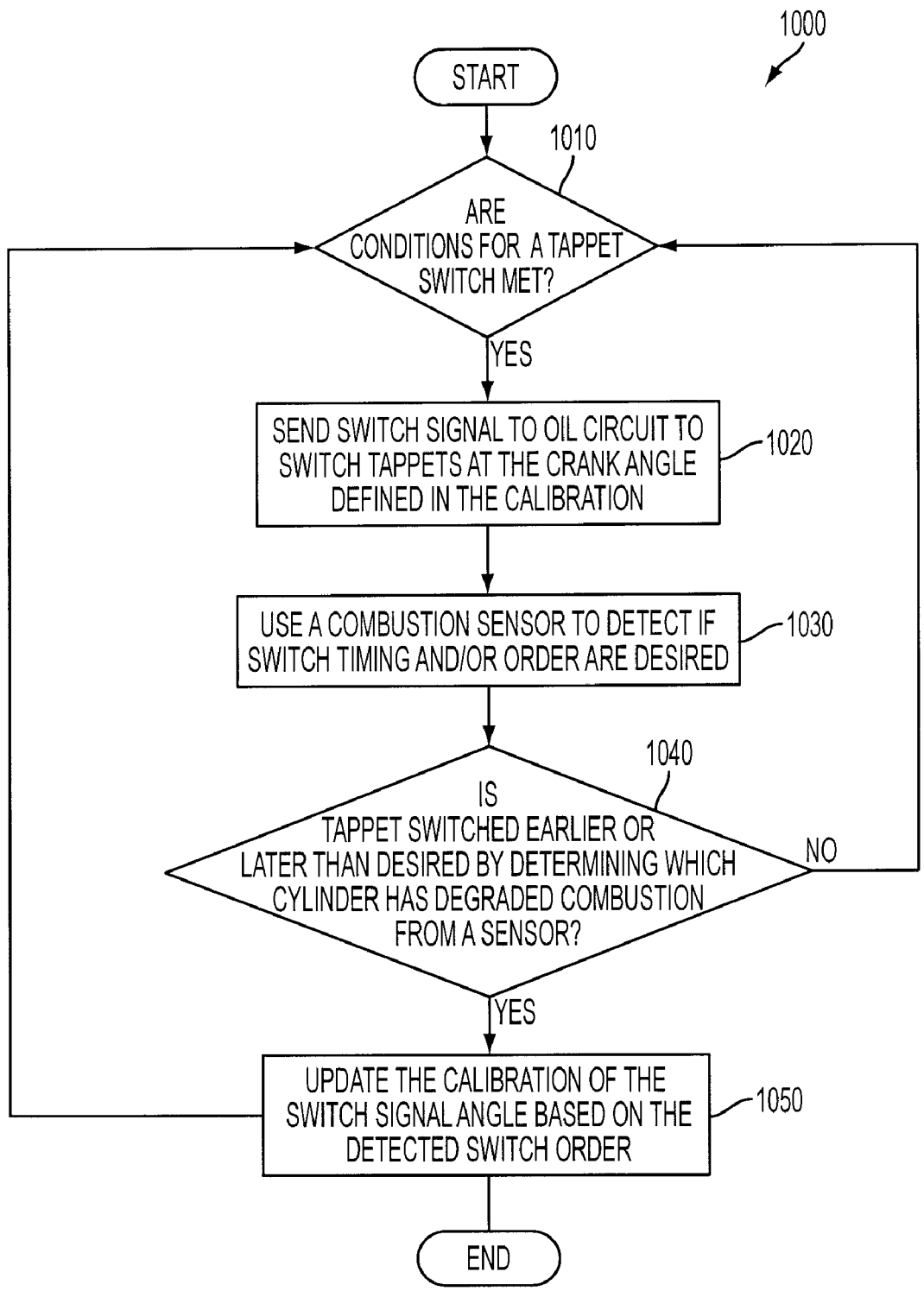
FIG. 10 shows an example flow chart for adaptive control of valve lift tappet switching.

Thus, in some embodiments, a combustion sensor may be used to provide information to the control system that may be interpreted to detect tappets that switched earlier or later than expected. Referring now to FIG. 10, an example flow chart for adaptive control of valve lift tappet switching is shown. The routine, in 1010, determines whether conditions for a tappet switch are met. The conditions may be steady state conditions where the desired tappet and/or cylinder switching order are known and achievable, and/or when it is desired to change a combustion mode between homogeneous charge compression ignition and spark ignition. If so, the routine continues to 1020 to send a switch signal to an oil circuit to switch tappets at the crank angle defined in the calibration. The calibration may be a correlation of crank angles with engine speeds, oil temperatures, or any suitable operating parameters which may achieve repeatable tappet switching timings and switching orders. Then, in 1030, the routine includes using a combustion sensor to detect if switch timing and/or switching order are desired or predefined. In one embodiment, the combustion sensor may be a knock sensor coupled on the engine head or on the engine block located near a cylinder. In another embodiment, the combustion sensor may be a pressure sensor installed inside a cylinder. In some embodiments, the combustion sensor may be an ion current sensor or gasket type sensor. The desired switching order may include predefined orders of cylinders performing desired combustion order such as SI or HCCI.

Next, the routine, in 1040, determines whether a tappet is switched earlier or later than desired. Information from the combustion sensor may include whether the combustion is spark ignited or compression or auto ignited. Alternatively, undesired combustion such as torque fluctuations, vibration, noise, or misfire may be detected by the combustion sensor. Further, information for the combustion sensor may be used to detect and/or adjusting combustion timing (e.g., via location of peak pressure). Thus, errors in tappet switching may be determined in 1040. If the answer to step 1040 is yes, the routine continues to 1050, otherwise the routine goes back to 1010. Continuing with FIG. 10, in 1050 the routine updates the calibration of the crank angle of the switch signal based on detected switch order and/or timing.

Figure 11:
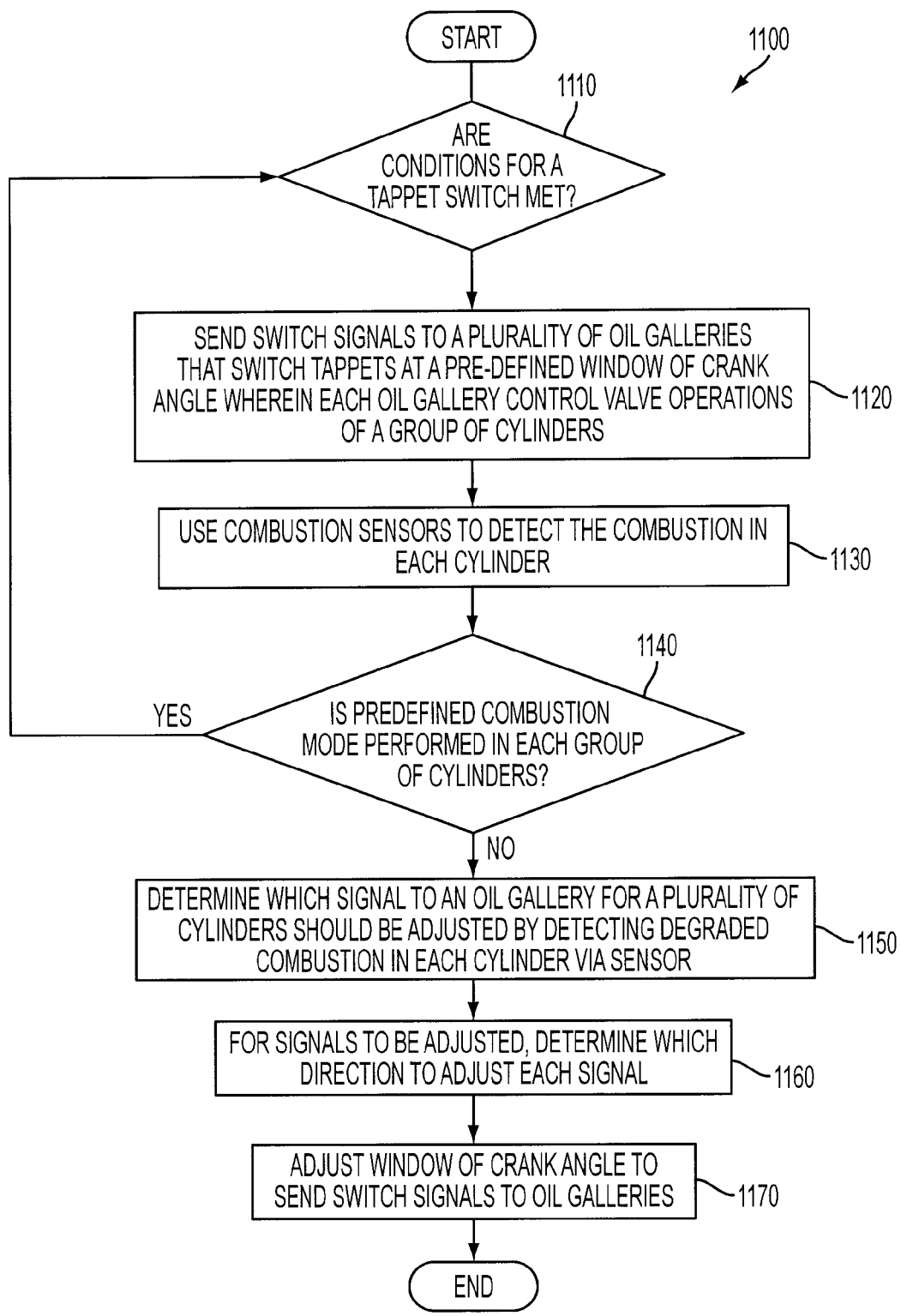
FIG. 11 shows an example flow chart for adaptive control of valve operations where multiple signals are used to control an oil circuit.

As described above with regard to FIGS. 4-5, an oil circuit used to control tappet switching may have a plurality of oil galleries. FIG. 11 illustrates an example flow chart for adaptive control of valve operations where multiple signals are used to control an oil circuit. The routine, in 1110, determines whether conditions for a tappet switch are met. The conditions may be steady state conditions where the desired tappet and/or cylinder switching order, and/or combustion modes are known and achievable. If so, the routine, in 1120, sends switch signals to a plurality of oil galleries that switch tappets at pre-defined windows of crank angle wherein each oil gallery controls valve operations of a group of cylinders. The crank angle windows for the cam profile switch or combustion mode may be predefined as illustrated in FIGS. 6-9. Examples of combustion modes and orders of combustion in each cylinder are also provided in FIGS. 6-9. The crank angle windows may be defined through calibration or any other suitable approaches. Then, in 1130, the routine includes using a combustion sensor to detect combustion in each cylinder. The sensor may detect whether combustion in each cylinder is performed in a desired mode such as spark ignition or compression ignition. The sensor may also detect misfire in a compression ignition mode. Additionally, information for the combustion sensor may be used to detect and/or adjusting combustion timing (e.g., via location of peak pressure).

Next, the routine, in 1140, determines whether a pre-defined combustion mode is performed in each group of cylinders whose valve operations are controlled by one oil gallery. If the answer is yes, the routine continues to step 1110. Otherwise, the routine continues to 1150 to determine which signal to an oil gallery for a plurality of cylinders should be adjusted by detecting in each cylinder whether degraded combustion has occurred via a combustion sensor. The determination may further be based on the number of cylinders having degraded combustion in the predefined combustion mode, which cylinders in the group have degraded combustion, and/or an order or sequence of cylinders having degraded combustion.

Next, in 1160, the routine determines which direction to adjust each signal for an oil gallery for the signals to be adjusted. The determination may be based on the combustion conditions of a group of cylinders whose valve operations are controlled by an oil gallery. Again, factors such as the number of cylinders having degraded combustion in the predefined combustion mode, which cylinders in a group have degraded combustion, and/or an order or sequence of cylinders having degraded combustion may affect the adjustment of the tappet switch signal. Thus, the timing to send a switch signal to an oil gallery or crank angle windows may be advanced or retarded based on the above factors to adapt to the changed combustion conditions and to control the change of combustion modes.

Next, in 1170, the routine adjusts the window of crank angle to send switch signals to oil galleries.

In this way, it is possible to adjust the timing of sending valve switching signals to a plurality of cylinders based on information at least from a combustion sensor.

Figure 12:
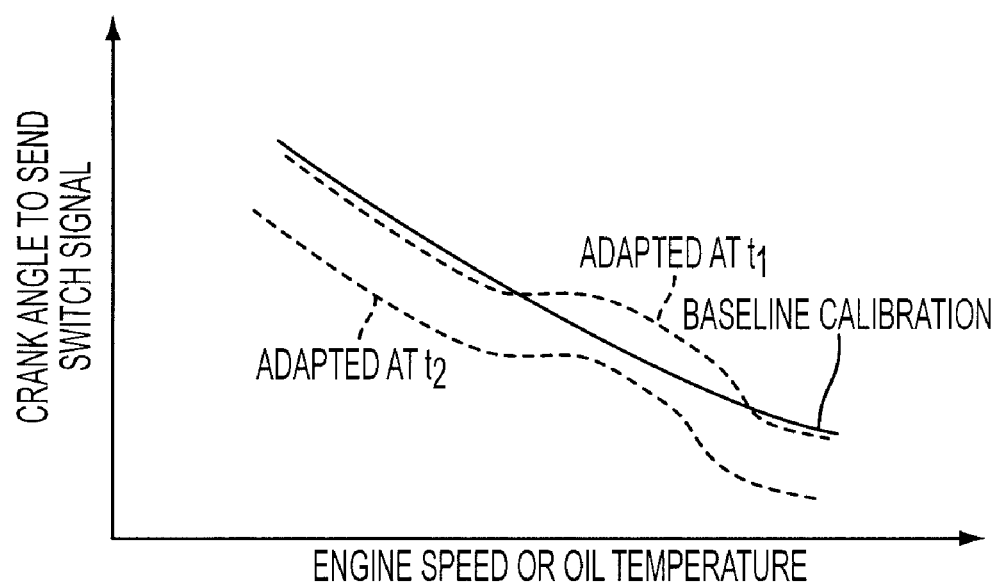
FIG. 12 shows a schematic graph of baseline correlation of crank angle to send switch signal with engine speed and adapted calibration over time.

Referring now to FIG. 12, a schematic graph of a calibration curve between crank angle and engine speed is illustrated. It should be noted that the calibration curve may be a correlation of crank angle with oil temperature or any other suitable parameters. The solid line in FIG. 12 represents a baseline calibration when the routine 1000 or 1100 starts. The two dotted lines represent calibrations curves at one time, t1 and another time, t2 after the baseline calibration.

FIG. 12 shows that calibration curves for the timing of tappet switching may be modified over time according to information from the combustion sensor. Thus, the above approach allows a learned modification to the calibration, adapting over time to account for system degradation or external difference, such as humidity or altitude that may affect the response time of the tappet switch. Furthermore, the correct switching timing based on learned modification may ensure efficient HCCI or auto-ignition combustion. As described above, a plurality of parameters may affect HCCI or auto-ignition combustion. The parameters include but are not limited to humidity, octane rating of the fuel, the amount of exhaust gases, etc. By modifying the tappet control signal switching time based on real time combustion condition, it is possible to account for the constant variation of the above parameters. Thus, tappet switching may be controlled accurately so that undesired conditions for specific combustion modes may be avoided or reduced. In one example, misfire in an HCCI mode may be reduced.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. As another example, various other mechanisms may be used in a system using two different valve profiles for each of the valves in a cylinder. Furthermore, the system may use selective deactivation of one or more valves to provide the correct flow conditions for compression or auto-ignition combustion. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling cylinder valve switching between a first valve condition and a second valve condition for transitioning between combustion modes of an engine, comprising:
adjusting timing of sending a signal to switch between said first valve condition in a first combustion mode and said second valve condition in a second combustion mode in response to information from a combustion sensor, wherein said combustion modes include spark ignition and homogeneous charge compression ignition.

2. The method of claim 1 wherein said combustion sensor is a knock sensor.

3. The method of claim 1 wherein said combustion sensor is one of a cylinder pressure sensor, an ion current sensor, and a gasket type sensor.

4. The method of claim 1 wherein said valve conditions include a first intake valve lift profile and a second intake valve lift profile, where the first intake valve lift profile is provided by first and second intake valves each actuated via a common camshaft where the lift profile of the first valve is different from that of the second valve, and said second intake valve lift profile is provided by switching at least a tappet of one of said first and second intake valve, said switch controlled by an oil circuit receiving said signal.

5. The method of claim 1 wherein said signal switches an exhaust valve between said first valve condition and said second valve condition.

6. A method to control valve switching orders for transitioning combustion modes of an engine, the engine also having a plurality of cylinders, each with at least a first valve profile and a second valve profile, where said valve profiles are changed by switching tappets controlled by an oil circuit, comprising:
sending a signal to the oil circuit to switch the tappets at a first predetermined switching order to transition combustion modes;
detecting a combustion performed in the cylinders using a combustion sensor;
adjusting a timing of sending the signal based on information from the combustion sensor.

7. The method of claim 6 wherein said combustion modes include spark ignition and homogeneous charge compression ignition.

8. The method of claim 6 wherein said combustion sensor is a knock sensor.

9. The method of claim 6 wherein said combustion sensor is one of a cylinder pressure sensor, an ion current sensor, and a gasket type sensor.

10. The method of claim 6 wherein said valve profiles operate intake valves.

11. The method of claim 6 wherein said valve profiles operate exhaust valves.

12. The method of claim 6 wherein said timing is adjusted based on at least one of which of said plurality of cylinders have degraded combustion, an order of cylinders having degraded combustion, and a number of cylinders having degraded combustion.

13. The method of claim 6 wherein the oil circuit further comprises a first oil gallery to control a valve profile of a first group of cylinders and a second oil gallery to control a valve profile of a second group of cylinders wherein a timing of sending a signal to the first gallery is adjusted based on combustion information in each cylinder in the first group and a timing of sending a signal to the second gallery is adjusted based on combustion information in each cylinder in the second group.

14. The method of claim 13 wherein said timings are adjusted based on an order of cylinders having degraded combustion.

15. The method of claim 13 wherein said timings are adjusted based on which cylinders in the engine have degraded combustion as detected by the combustion sensor.

16. A system for operating an engine of a vehicle, the engine having at least a first cylinder, the system comprising:
a first intake valve in the first cylinder;
a second intake valve in the first cylinder;
the first intake valve and the second intake valve actuated via a common camshaft, where a lift profile of the first intake valve is different from a lift profile of the second intake valve, where an actuating tappet of the second intake valve has a deactivation device configured to deactivate the second intake valve, and where an actuating tappet of the first intake valve is continually actuated by said camshaft;
a combustion sensor;
a controller configured to send a signal to actuate said tappet, where a timing of sending said signal is adjusted in response to information from said combustion sensor.

17. The system of claim 16 wherein the lift profile of the first intake valve is shorter than the lift profile of the second intake valve.

18. The system of claim 17 wherein the lift profile of the first intake valve is smaller than the lift profile of the second intake valve.

19. The system of claim 16 further comprising a controller for,
during a first mode, operating with the first intake valve active and the second intake valve deactivated during a cycle of the first cylinder, where during said operation, the first intake valve is open at least partially during an intake stroke to allow at least air to enter the first cylinder, where the air is mixed with fuel and compressed to attain auto-ignition; and
during a second mode, operating with the first and second intake valves active during a cycle of the first cylinder, where during said second mode, the first and second intake valves are open at least partially during an intake stroke to allow at least air to enter the first cylinder, where the air is mixed with fuel and ignited via a spark from an ignition plug.

20. The system of claim 19 further comprising:
a first exhaust valve in the first cylinder;
a second exhaust valve in the first cylinder;
the first exhaust valve and the second exhaust valve actuated via a common camshaft, where a lift profile of the first exhaust valve is different than a lift profile of the second exhaust valve, where an actuating tappet of the second exhaust valve has a deactivation device configured to deactivate the second exhaust valve, and where an actuating tappet of the first exhaust valve is actuated by the camshaft under all conditions.

* * * * *